March 14, 1961 H. KERNEN 2,974,930
LIFTING JACK
Filed June 12, 1959
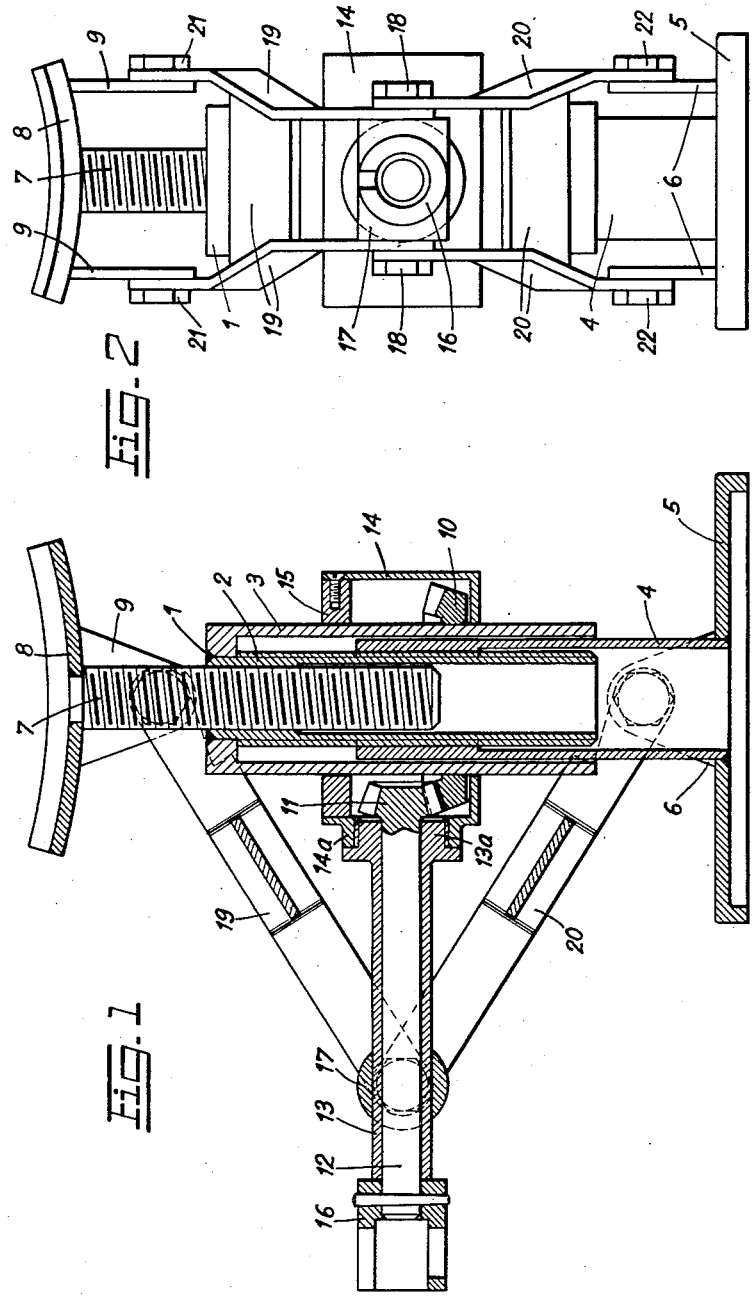
INVENTOR
Hans Kernen
By Stevens, Davis, Miller & Mosher
ATTYS.

United States Patent Office 2,974,930
Patented Mar. 14, 1961

2,974,930

LIFTING JACK

Hans Kernen, Engehaldenstrasse 69, Berne, Switzerland

Filed June 12, 1959, Ser. No. 820,029

Claims priority, application Switzerland June 16, 1958

3 Claims. (Cl. 254—102)

The present invention relates to lifting jacks which are used for example for lifting motor cars and trucks. It relates more particularly to a well known kind of jack in which the lifting is produced by a screwing motion.

The primary object of the invention is to provide means that prevent relative rotation of a base and of a part supporting the load, and of a gearing case serving as a bearing for a rotary driving member used for actuation of the jack.

Other objects consist in providing a lifting jack that is easy to manipulate, sturdy in operation and nonexpensive.

Other objects and features of the invention will appear in the course of the following description of a preferred embodiment of the invention with reference to the accompanying drawings, in which:

Fig. 1 is a vertical section view and
Fig. 2 is a side view.

The lifting jack represented in the drawings comprises an intermediary member consisting of two coaxial sleeves 2 and 3 welded or otherwise rigidly connected with each other at 1. Sleeve 2 has an external thread over almost its whole length and also an internal thread in the upper portion of its length; these threads have the same pitch, but one of them is right-handed and the other one is left-handed. The external thread is in screwing engagement with an internally threaded portion of a sleeve 4 adapted to move within an annular space provided between the sleeves 2 and 3; the lower end of the sleeve 4 is welded or otherwise rigidly connected to a soleplate 5; the sleeve 4 and the sole plate 5 constitute together a lower end member. The internal thread of part 2 is in screwing engagement with a screw spindle 7 having its upper end welded or otherwise rigidly connected to a load supporting plate 8; the spindle 7 and the plate 8 constitute together an upper end member.

A bevel gear 10 is welded to the external surface of the sleeve 3 and meshes with a bevel pinion 11 made integral with, or rigidly connected to, one end of an actuating shaft 12. The axis of rotation of this shaft is perpendicular to the common longitudinal axis of the three afore-mentioned members 2, 3; 4, 5; 7, 8. The actuating shaft 12 is mounted for rotation in a sleeve-like part 13 of a bearing assembly that comprises also a gear casing 14, 15 mounted for rotation on the sleeve 3 of the intermediary member. Any substantial longitudinal motion of this casing with regard to the sleeve 3 is prevented because the bevel gear 10 is arranged with only a minimum of longitudinal play between the bevel pinion 11 and the bottom of the pot-like part 14 of the gear casing; the other part 15 of this casing is an annular disc fixed to this part 14 by means of screws. At one side the peripheral portion of part 14 has an internally threaded flange 14a adapted for receiving and rigidly holding a correspondingly shaped portion 13a of the sleeve-like part 13. A coupling part 16 of well known construction, to which a crank handle (not shown) may be removably fitted in the usual manner, is rigidly secured to the end of axle 12 that is remote from the bevel pinion 11. Means are provided for preventing any relative rotation of the end members 7, 8 and 4, 5 with regard to each other and also any rotation of the bearing assembly 13, 14, 15 with regard to these end members. These means are now to be described in detail. Part 13 constitutes over the major portion of its length a guiding portion perpendicular to the common axis of relative rotation of the intermediary member with rgeard to the end members; a block 17 is mounted on this guiding portion for sliding motion longitudinally thereof. Two H-shaped links 19 and 20 are pivotally connected with one of their ends to the block 17 by means of pivot screws 18. The links 19, 20 have equal lengths. The link 19 is pivotally connected at its other end to lugs 9 welded to the load-supporting plate 8, by means of pivot screws 21. In a similar manner the link 20 is pivotally connected at its other end to lugs 6 welded to the sole plate 5 by means of pivot screws 22.

The mode of operation is as follows: The rotary motion given to the actuating shaft 12 by turning the crank handle is transmitted to the part 2 of the intermediary member by means of the bevel gearing 11, 10 and of the outer part 3 of the intermediary member. The links 19, 20 and the block 17 interconnect the upper end member 7, 8 and the lower end member 4, 5 to prevent a relative rotation of these members with regard to each other and with regard to the bearing assembly 13, 14, 15. The rotary motion of the intermediary member 2, 3 produces equal longitudinal motions of the end members in opposite directions with regard to the intermediary member and the bearing assembly since the screw connections of the intermediary member with either one of the end members are opposite-handed, but have the same pitch; during this longitudinal motion of the end members the block 17 slides on the part 13. If a load should be lifted, the shaft 12 is turned in one direction to have the end members moving apart from each other; on the contrary, if a load supported by the jack is to be lowered, the shaft 12 is turned in the opposite direction.

Many modifications of details may be made on the embodiment shown and described by way of example, within the scope of the patent defined in the appended claims.

What I claim is:

1. A lifting jack comprising a first end member, a second end member, and an intermediary member having oppositely-handed threads in screwing connection with respective ones of said end members, rotary means for rotating said intermediary member, a bearing assembly for said rotary means, and means preventing a relative motion of said end members with regard to each other and with regard to said bearing assembly, said first and second end members and said intermediary member having a common axis of relative rotation, said oppositely-handed threads having the same pitch, said bearing assembly including a guiding portion perpendicular to the above-mentioned common axis of relative rotation, and said means preventing a relative rotation including a block mounted on said guiding portion for sliding motion longitudinally thereof and two links of equal length which are pivotally connected at one of their ends to said block and at their other end to respective ones of said end members.

2. A lifting jack comprising in combination: a first end member including a threaded part, a second end member including a threaded part, an intermediary member including an outer tubular part and an inner tubular part rigidly connected to each other and coaxial with the threaded parts of the first and second end members, the inner tubular part having two oppositely-handed, equally pitched threads, one provided at its inside being screwably engaged with the threaded part of said first end member and the other provided at its outside being screwably engaged with the threaded part of the second end member, a first gear secured to the outer tubular member, an actuating shaft extending in a plane perpendicular to the common axis of said first and second end members, a second gear rigidly connected to said actuating shaft and meshing with said first gear, a bearing assembly rotatably but axially fixedly mounted on the outer tubular part, a block mounted on the bearing assembly for sliding motion parallelly with the axis of rotation of said actuating shaft, and two links of equal length which are pivotally connected at one of their ends with said block and at their other end with respective ones of said end members.

3. A lifting jack comprising a first end member, a second end member, an intermediary member having oppositely-handed threads in screwing connection with respective ones of said end members, rotary means for rotating said intermediary member, a bearing assembly for said rotary means, retaining means preventing relative motion of said end members with regard to each other and with regard to said bearing assembly, said bearing assembly including a projecting guiding portion, and said retaining means including a block slideably mounted on said guiding portion for sliding movement, and two links pivotally connected at one of their ends to said block and at their other end to respective ones of said end members.

References Cited in the file of this patent

UNITED STATES PATENTS

| | | |
|---|---|---|
| 1,396,314 | Berg | Nov. 8, 1921 |
| 1,659,785 | Rodman et al. | Feb. 21, 1928 |